May 30, 1933.  A. J. CAWLEY  1,911,431
IRRIGATION APPARATUS
Filed May 14, 1931  2 Sheets-Sheet 2

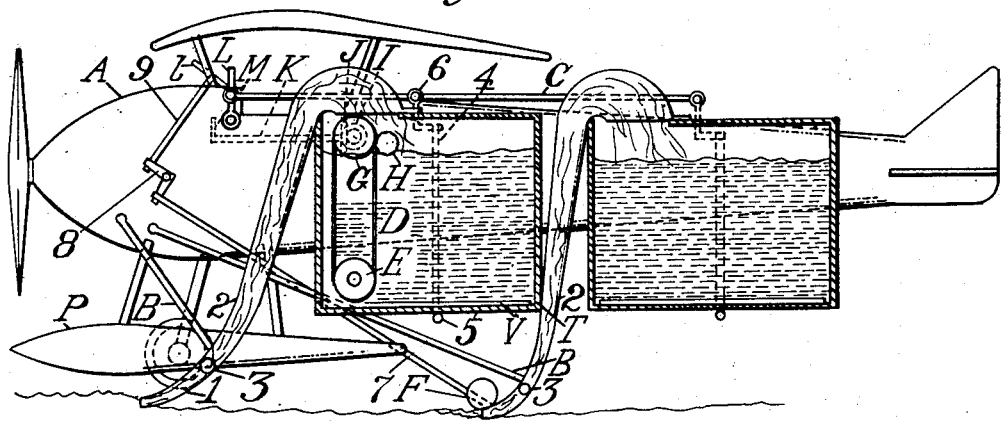
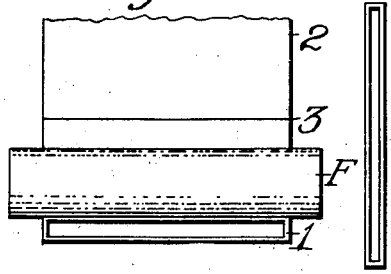
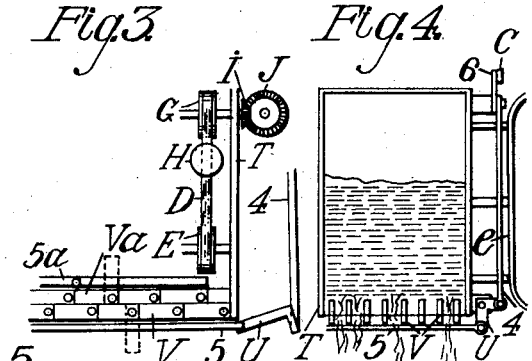
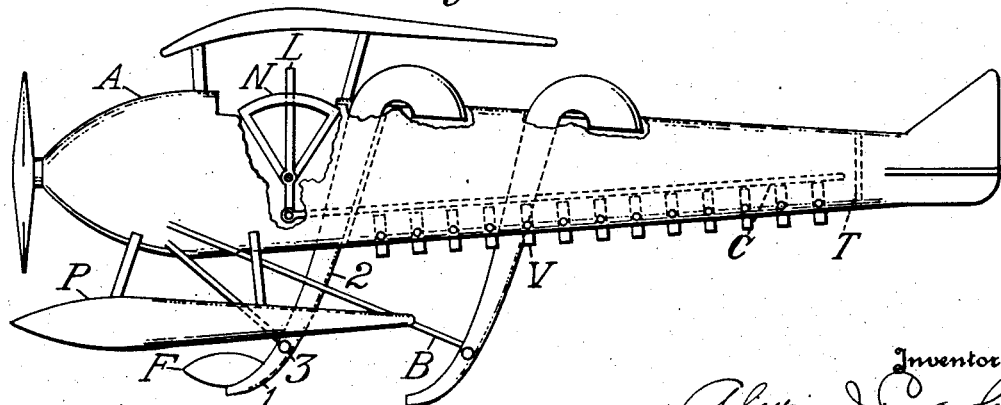

Inventor
Aloysius J. Cawley

Patented May 30, 1933

1,911,431

UNITED STATES PATENT OFFICE

ALOYSIUS J. CAWLEY, OF PITTSTON, PENNSYLVANIA

IRRIGATION APPARATUS

Application filed May 14, 1931. Serial No. 537,245.

The invention has as its object the taking up of water from a lake, river, or other body, and the deposition of this water at any point and at any rate desired without the necessity of stopping the flying machine at any time.

Some of the other objects of the invention are: the provision of means for determining at any instant the amount of water carried by a flying machine; the provision of means for permitting the water to escape in any quantity desired; means for preventing the picking up apparatus from dipping too low into the water.

One very important object is the production of an air plane which is designed particularly for such water picking up and distributing purposes at all times.

This application is a continuation in part of my application Serial Number 513,647, filed February 5, 1931, for irrigation process.

Those and other features of the invention are hereinafter described with reference to the accompanying drawings, in which, Figure 1 is an elevational view of an airplane equipped with irrigating means.

Figure 2 is a front view of a scoop provided with a float used by an airplane for scooping up water.

Figure 2a is a front view in elevation of a modified form of scoop.

Figure 3 is an elevational view of a water receptacle provided with rapid emptying means and also a device for indicating the amount of water contained therein.

Figure 4 is an elevational view of a receptacle provided with rapid emptying means and means for attaching it to an airplane.

Figure 5 is an elevational view of an airplane having fluid storing means in its fuselage and provided with means for filling and emptying this storing means while in flight.

Figure 6:
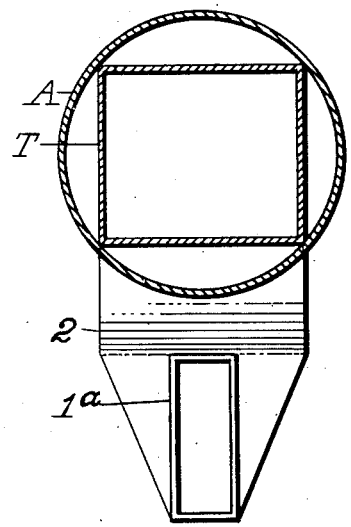
Figure 6 is a front elevational view of an airplane provided with a modified scoop.

Figure 1 illustrates an ordinary plane which is provided with four tanks T, two on each side. Each of those tanks is provided with scoops 1, as described in the above mentioned application. Those scoops may be likened to flattened tubes, and are provided with one or more flexible joints 3, as desired. The water passes upwards through widening tubes 2, which deposits it in the tanks T. Those tanks are intended to be rigidly bolted or strapped on to the planes, as described in the previous application. It is very important that they should be rigidly attached to the plane. Such scoops are used in railroad work for the purpose of filling locomotive tanks while the train is going at full speed. Figures determined actually in practice show that a scoop such as 1 having a width of 13 inches and dipping into the water to a depth of 4 or 5 inches will pick up at a speed of forty five miles an hour 2.9 gallons of water for each foot traversed. If the four scoops each have a width corresponding to this, it would mean that about twelve gallons of water are scooped up for each foot the plane moves. This would mean that if the plane is moving at a speed of sixty miles per hour, it is moving at a speed of 88 ft. per second, and would scoop up 12 times 88 or 1156 gallons per second, or nearly three tons of water. This brings out the fact that the loading time of such airplane tanks is negligible. If the plane flew at sixty miles per hour, it would mean that it would take two minutes to complete a round trip from the water supply to a point one mile distant. Such a plane could keep up a rate of over a ton of water per minute supplied in the form of mist or "artificial rain" over a farm one mile distant.

It is very desirable to bring out the fact that the scoops are rigidly held in position by attachment by braces B to the solid engine body to overcome the great resistance of the water. Means are provided for raising the scoops when not in operation such as for instance, lever 1, rod 9, crank 8 and rod 7. The scoop is pivoted at 3 as described for instance in U. S. Patent 1,016,731 of February 6, 1912. It is to be noted that when the scoop is raised up, it is clear of the surface of the land or water, so that either the wheel or the pontoon P is permitted to function. It is to be also noted that when the scoops 1 are lowered they are much below the wheel and pontoon and thus engage with the water of the river or lake. Floats F are provided in such manner that the scoops do not dip too deeply in the water. The opening of the scoop is adjustable so that any desired rate of scooping may be attained.

In order that the operator may know when the tanks are full or empty, means may be provided such as a bell to apprise him of such facts. Figure 1 illustrates a method of accomplishing this, which consists of providing a float H which is rigidly attached to a chain D which passes over sprocket wheels G and E in such manner that there is no slippage between the wheels and chain. Wheel G is mounted on the same shaft with the small bevel gear wheel I, which engages with large bevel wheel J, which turns shaft K. Indicator, which may be a pointer M is mounted upon K. Or it may consist of a cylinder having "full", "empty", etc., marked upon it. The shaft K makes one revolution for the movement of the float H from its highest to its lowest position, and the exact amount of water in the tanks is thus readily determined. Any means desired may be used for informing the pilot of the amount of water in the tanks.

Any desired amount of "rainfall" may be produced by means of valves located in the floor of the tanks and better illustrated in Figures 3 and 4. Rod 5 is attached to the blades of the valves V, this is in turn operated by rocket arm U, which operates rod 4. When a certain "rainfall" is desired, lever L is moved to the position desired which indicates that amount at the speed the plane is moving. This information is given on the scale N of Figure 5. Lever L operates rod C, which operates crank 6. The motion is then transmitted through rod 4, crank U and rod 5 so that the valves V are opened the desired amount. As the plane moves at its normal speed, the water is let out and dashed into a spray or "rain" and deposited on the farm or forest fire, or the like.

A detailed view of the scoop is shown in Figure 2. The mouth of the scoop is shown at 1. A float of any type is provided which prevents more than the necessary amount of dipping of the scoop into the water. The conducting of the scoop or the conduit is shown at 2, while 3 indicates the flexible joint, which is not illustrated in detail but which is to be found in the above patent covering such scoops. While the plane may be loaded in one second, still it is not necessary to load it in such a short time, as the scoop attached to the plane may ricochet over the surface in a skipping manner. It may touch for a short instant, then clear and touch again and so on. The mouth of scoop 1 may be narrowed to any extent desired as shown at 1a, 1b and 1c. This will prevent the too rapid scooping up of the water. A wind shield or other means of overcoming the wind resistance offered by the scoop and conduits 1 and 2 is provided in the well known manner. The scoops should be placed at such a position on the plane as to prevent the latter from diving into the water when the resistance occasioned by the scooping operation is encountered. It is also to be pointed out that the last or rear scoop may be made to engage first, so that the water is scooped into the rear portion of the plane first and acts as a stabilizing means. However, it is to be remarked that the engine is placed at the forward portion of the plane, and that the plane is going at its highest speed when empty. Therefore, all of the possible speed and developed horse power may be utilized for the scooping operation. The forward momentum would be too great to permit the upsetting or diving of the plane by the scooping operation. The floats prevent the scoops from sinking too far. The floats shown are supposed to be filled with air or other gas. The plane may make a dive to gain speed and glide horizontally over the surface and then cause the scoops to engage with the water. The tanks are purposely shown as deep in Figure 1, but may be any depth or form desired.

A detailed view of the water indicating means is shown in Figure 3, as well as a special type of valve floor for the tanks. H is the float rigidly attached to the sprocket chain D which cooperates with the sprocket wheels G and E causing the small bevel gear wheel I to move and in turn transmit motion to the large bevel wheel J which is mounted on shaft K operating the indicating means proper.

A double valved floor is shown in this figure. The lower row of valve flaps V is shown below and operated by means of the rod 5, which in turn is operated by rocker U and rod 4. The upper row of valves Va opens upwardly. The rod 5a operates this row. The dotted rectangles show the valves in their open positions, one valve being shown open in each row. This arrangement provides a means that is absolutely leakproof, yet which is capable of being instantly opened to any extent desired. The tank wall is indicated at T.

The valves which are shown in Figure 3 are more leak proof than the ordinary single layer of valves for the following reasons. If but one layer of valves were used, the water would simply have to traverse the space between adjacent valve leaves equal to the thickness of the valves in order to escape. However, in the case of the double layer of valves, since the valve leaves are so placed that the joints, or spaces between the leaves are placed opposite the center of the lower layer of valve leaves, when the water has traversed the space between the upper valve leaves, it has but commenced its journey of escape. It must then divide at the center of the upper surface of the lower valve leaf and pass along the upper surface of the lower leaf in the space between the two layers of valves. This is very difficult, due to the fact that the upper and lower layers of valves are in intimate contact. When it has reached the spaces between the lower valve leaves, it then traverses those spaces and escapes from the tank. In short, if but one layer of valves were used, the water would merely have to travel a distance between the valve leaves equal to the thickness of the valves. However, when there are two layers of valves, to this distance is added a distance equal to the width of the valve leaf and in addition a distance equal to the thickness of the second layer of valves. In two layers of valves, therefore, the distance traversed equals twice the valve leaf thickness plus a distance equal to the width of a valve leaf. In the illustration, therefore, the water would have to traverse a series of crevices of a total length equal to approximately six times that traversed in the case of the modification wherein a single layer of valves might be employed.

There is also the very great advantage that the pivoted sides of the valve leaves in the lower layer, being placed immediately below the center of the valve leaves in the upper layer, act as supports to the latter, and thus aid very greatly in supporting the body of water in the tank.

Figure 7:
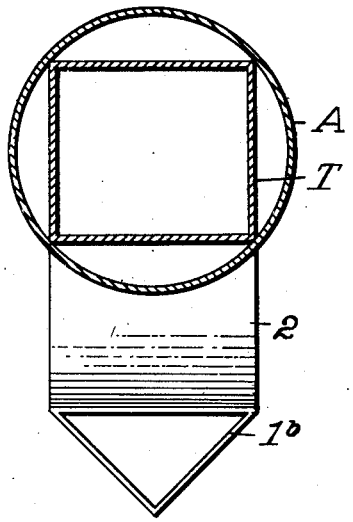
Figure 7 is a front elevation of an airplane provided with another modification of a scoop.
Figure 8:
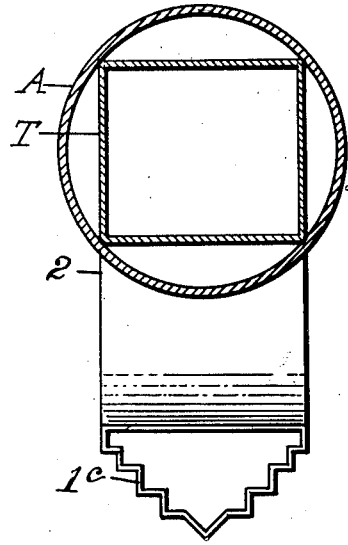
Figure 8 is a front elevational view of an airplane provided with still another modification of scoop.
Figure 9:
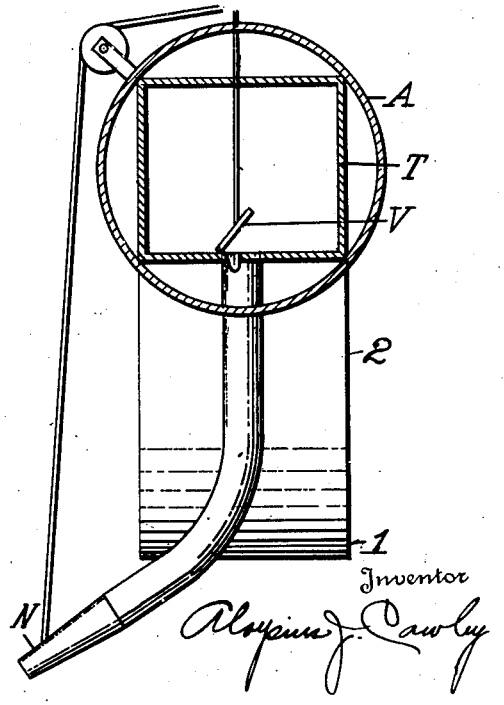
Figure 9 is a rear elevational view of an airplane equipped with a flexible tube.

Figures 2a and 6 illustrate another modification of the mouth of the scoop. It will be noticed that the scoop 1a of Figure 6 is placed in a vertical position. A curved tube 2 leads from this to the tank T in the usual manner. The object is that the plane may scoop up its load at any rate desired, by varying the extent to which it dips into the water. When the scoop first touches the water, it may be only immersed a few inches, and a certain amount of water will be scooped up. The depth of immersion, and consequently the rate of scooping may thus be varied at will. This scoop may have the form of an inverted triangle as shown at 1b of Figure 7, instead of the narrow rectangle shown. Or it may be made progressively wider in successive steps from below upward, if desired, as shown at 1c of Figure 8.

Figure 4 is another illustration of the tank. It should be rigidly attached to the plane body by suitable means. One of the many means is illustrated at e. The valve leaves are shown at 5 and are operated by rod 5, rocker arm U, rod 4, rocker arm 6 and connecting rod C, which is attached to the lever L of Figure 1. This brings out the fact that the tank may be made literally bottomless in an instant, and the water let out in torrents.

The above descriptions concern more the equipping of an ordinary plane with tanks and scoops and distributing means. However, it is highly desirable to provide planes which are specially equipped for water carrying and distributing purposes. Figure 5 illustrates such a device, which may be termed an airplane fire extinguisher or irrigation plane. This shows an ordinary plane A which carries the tank T in its fuselage. This tank extends all of the way from the forward scooping apparatus 2 to the last available space in the tail. All possible space is utilized. The pontoon is shown at P. The scoop is shown at 1 with one of the many forms of floats F that may be used. It is to be here noted that the float F may take the form of two pontoons one on each side of the scoop 1, the pontoons having forms something similar to that of pontoon P. B indicates the very desirable brace for firmly holding the scoop during the scooping operation. The scoop is thus braced to the engine, or the heaviest and most solid portion of the plane. The jointed character of the scoop is shown at 3. Means for raising and lowering the scoop are not shown. The two scoops with their conduits are shown at 1 and 2. It will be noted that one is directly behind the other and both are located in the center line of the plane. Far less wind resistance is offered by this construction than in that just described, as most of the structures are located in the plane body. The floor of the tank is covered with valves V, and these are opened and closed by means of the connecting rods C, which are in turn operated by means of the lever L, which moves over the scale N or its equivalent. This scale shows the amount of water that will be deposited over the ground surface at certain speeds and for certain degrees of opening of the valves V.

As an added feature, a hose and nozzle may be attached to the tank and used for directing more accurately the fluid contained in said tank upon objects as desired. This will be particularly useful in fighting forest fires. The plane will in certain cases of fire fighting, particularly those involving a small area fire, circle around the burning spot, describing as small a circle as possible. The hose may in such case be directed inward toward the center of the circle. The water can thus be directed continuously upon virtually the same identical spot with extreme accuracy. A plane unequipped with the hose and nozzle, in executing the above manœuvre, simply distribute the water in a circle around the spot containing the fire.

It is also customary in discharging bombs in military and naval manœuvres, for an airplane to dive almost vertically downward during the operation of discharging the bomb. The bomb can thus be directed upon a small spot or area with extreme accuracy. Therefore, in using the fire fighting plane, for instance that shown in Figure 4, may dive down nearly vertically with the valves closed, when the water will run out through the chutes and scoops, thus retracing its original course, and be directed with exceeding accuracy upon a very small fire. This is very important in forest fire fighting, and overcomes one of the great difficulties encountered in using airplanes for the extinguishing of forest fires, as the turning radius of the plane is usually too great to follow accurately the zig zag or otherwise irregular outline of the forest fire. However, to facilitate rapid emptying of the tanks while diving, large valves may be placed in the rear surfaces of the chutes at the region located in the tanks. When those valves are opened, the water rushes into the scoops uninterruptedly and passes out of the wide scoops in torrents. In this manner, enormous amounts of water are directed in torrents upon a single burning spot in a forest or other fire.

Having described my invention, I claim as new and desire to secure by Letters Patent:

1. In combination a flying machine, fluid storing means attached to said machine, means including a scoop for taking up fluid from a fluid source into said storing means while said machine is in flight thereover, means for emptying said fluid storing means at predeterminable, variable rates while said machine is in flight, consisting of a plurality of valves occupying substantially all of the floor of said fluid storing means and means cooperating with said valves for rapidly operating said valves.

2. In combination a flying machine, fluid storing means attached to said machine, means for taking up fluid from a fluid source into said storing means while said machine is in flight thereover, means for determining the quantity of said fluid in said fluid storing means, means for emptying said fluid storing means at predeterminable, widely variable rates while said machine is in flight, consisting of a plurality of valves occupying substantially all of the floor of said fluid storing means and means cooperating with said valves for rapidly operating said valves.

3. In combination a flying machine, fluid storing means attached to said machine, means for taking up fluid from a fluid source into said storing means while said machine is in flight thereover, means for determining the quantity of said fluid in said fluid storing means, a float for preventing said means for taking up fluid from sinking too deeply in said fluid and means for emptying said fluid storing means at predeterminable, variable rates while said machine is in flight.

4. In combination a flying machine, a completely closed fluid receptacle in the body of said machine, a scoop and chute taking up water or fluid into said fluid receptacle while said machine is in flight over a body of said fluid, said scoop and chute acting to empty said receptacle when said machine executes a dive.

5. In combination a flying machine, a fluid receptacle forming part of said machine, a scoop and chute for taking up fluid from a fluid body and introducing said fluid into said fluid receptacle while said machine is in flight over said fluid body, means for emptying said fluid receptacle at predeterminable variable rates, consisting of a plurality of valves occupying substantially all of the floor of said receptacle and means in cooperative relation with said valves for rapidly operating said valves.

6. In combination a flying machine, a fluid receptacle contained in said machine, a scoop and chute for taking up fluid from a fluid body and introducing said fluid into said receptacle while said machine is in flight over said fluid body, said scoop being located considerably below said receptacle, means for indicating the amount of fluid in said fluid receptacle, and for emptying said fluid receptacle at predeterminable variable rates, consisting of a plurality of valves occupying substantially the entire floor of said receptacle and means for rapidly operating said valves.

7. In combination an air plane, a fluid receptacle contained in the body of said air plane, a scoop for scooping water into said fluid receptacle while said plane is in flight over a body of water, said scoop being located considerably below said receptacle and, for emptying said receptacle at predetermined and variable rates, consisting of a plurality of valves occupying substantially all of the floor of said receptacle and means cooperating with said valves for rapidly operating said valves.

8. In combination an airplane, a water receptacle in the fuselage of said plane, a scoop and conduit cooperating with said water receptacle in order to scoop up water into said receptacle while said air plane is in flight over a body of water, a plurality of valves in the floor of said receptacle and means for operating said valves.

9. In combination an airplane, a fluid receptacle in the fuselage of said airplane, a scoop and chute for taking up fluid from a fluid body and introducing said fluid into said receptacle while said airplane is in flight over said body and means for emptying said receptacle consisting of a flexible, dirigible tube.

10. A fluid receptacle, a plurality of valves in the floor of said receptacle, said valves occupying substantially all of the floor of said receptacle, means for accurately operating said valves in order to distribute fluids at predetermined rates and means for indicating the amount of fluid in said receptacle.

11. A fluid receptacle, the floor of said tank consisting of two layers of valves, one of said layers of valves opening upwards and the other of said layers of valves opening downward and means for operating said valves.

12. A fluid receptacle, a plurality of valves in the floor of said receptacle, means for accurately operating said valves to varying predetermined degrees, means for attaching said receptacle to a flying machine, and scoop and chute operatively connected with said fluid receptacle.

13. A fluid scooping means attachable to an aircraft, a flexible joint in said scooping means, a fluid receptacle operatively connected to said scooping means, and a float for holding said scooping means in operative position in a fluid source.

14. A fluid scoop, a tank operatively connected to said scoop, a flexible joint in said scooping means, a float for holding said scooping means in operating position and means for raising said scoop out of operating position at will.

15. In combination: a flying machine, a fluid receptacle attached to said machine, means in cooperative relation with said receptacle for engaging with the surface of fluid over which said machine is designed to fly, in such manner as to cause said fluid to be taken up, due to its inertia, and introduced into said receptacle, the mouth of said engaging means being in the form of an inverted triangle so that the amount of fluid taken up will vary in proportion to the degree of immersion of said engaging means in said fluid.

16. In combination: a flying machine, a fluid receptacle attached to said machine, means in cooperative relation with said receptacle for taking up fluid by virtue of the inertia of said fluid as said machine flies over a body of said fluid and introducing said fluid into said fluid receptacle, the mouth of said engaging means being in the form of a vertical rectangle whose height is much greater than its width in order that the amount of said fluid taken up by said engaging means shall vary in proportion to the degree of immersion of said engaging means in said fluid.

17. In combination: a flying machine, a fluid receptacle attached to said machine, means in cooperative relation with said receptacle for taking up fluid by virtue of the inertia of said fluid as said machine flies over a body of said fluid and introducing said fluid into said fluid receptacle, the mouth of said engaging means being arranged in the form of periodic enlargements in the width of said engaging means, in order that the amount of fluid taken up by said engaging means shall vary with the depth of immersion of said engaging means in said fluid.

ALOYSIUS J. CAWLEY.